(12) United States Patent
Stone et al.

(10) Patent No.: US 7,069,558 B1
(45) Date of Patent: Jun. 27, 2006

(54) SYSTEM AND METHOD FOR INTERACTIVELY UTILIZING A USER INTERFACE TO MANAGE DEVICE RESOURCES

(75) Inventors: Glen D. Stone, Los Gatos, CA (US); Bruce A Fairman, Woodside, CA (US); Harold A. Ludtke, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 698 days.

(21) Appl. No.: 09/634,213

(22) Filed: Aug. 9, 2000

Related U.S. Application Data

(63) Continuation-in-part of application No. 09/521,308, filed on Mar. 9, 2000, now Pat. No. 6,973,653.

(51) Int. Cl.
*G06F 9/46* (2006.01)

(52) U.S. Cl. ...................... 718/104; 718/100
(58) Field of Classification Search ................ 718/100, 718/102, 104–5; 709/202, 213–4, 223–224; 710/100, 260, 300, 305–6
See application file for complete search history.

(56) References Cited

U.S. PATENT DOCUMENTS

| | | | |
|---|---|---|---|
| 5,640,595 A * | 6/1997 | Baugher et al. | 710/10 |
| 5,838,968 A * | 11/1998 | Culbert | 718/104 |
| 5,961,585 A | 10/1999 | Hamlin | |
| 6,169,725 B1 | 1/2001 | Gibbs et al. | |
| 6,223,201 B1 * | 4/2001 | Reznak | 718/102 |
| 6,389,012 B1 * | 5/2002 | Yamada et al. | 370/357 |
| 6,408,355 B1 * | 6/2002 | Toguchi | 710/314 |
| 6,418,459 B1 * | 7/2002 | Gulick | 718/104 |
| 6,421,702 B1 * | 7/2002 | Gulick | 718/102 |
| 6,453,376 B1 * | 9/2002 | Fairman et al. | 710/240 |
| 6,496,864 B1 * | 12/2002 | McCartney | 709/226 |
| 6,502,123 B1 * | 12/2002 | Gulick | 709/102 |
| 6,591,290 B1 * | 7/2003 | Clarisse et al. | 709/205 |
| 6,763,519 B1 * | 7/2004 | McColl et al. | 718/100 |

\* cited by examiner

*Primary Examiner*—Meng-Al T. An
*Assistant Examiner*—Syed J Ali
(74) *Attorney, Agent, or Firm*—Gregory J. Koerner; Redwood Patent Law

(57) ABSTRACT

A system and method for interactively utilizing a user interface to manage device resources comprises at least one resource characterization that includes resource requirements for executing a requested process. An allocation manager may then compare the resource requirements for the requested process to the currently-available device resources. The allocation manager may then authorize or deny the requested process depending upon whether the currently-available resources are sufficient to adequately service the resource requirements of the requested process. An interface manager may provide relevant information from sources such as the resource characterization and the allocation manager to a user interface to thereby allow a system user to interactively manage device resources.

5 Claims, 13 Drawing Sheets

SYSTEM AND METHOD FOR INTERACTIVELY UTILIZING A USER INTERFACE TO MANAGE DEVICE RESOURCES

This application claims priority as a Continuation-In-Part application of U.S. patent application Ser. No. 09/521,308, entitled "Method For Utilizing Resource Characterization To Optimize Performance In An Electronic Device," filed on Mar. 9, 2000, now issued as U.S. Pat. No. 6,973,653. This application is also related to, and claims priority in, U.S. Provision Patent Application Ser. No. 60/161,206, entitled "Method For Implementing Scheduling Mechanisms By Utilizing Resource Characterizations," filed on Oct. 21, 1999, and to U.S. Provisional Patent Application Ser. No. 60/160,991, now abandoned entitled "Method For Quantifying Available System Resources Associated With A Hardware Component," filed on Oct. 21, 1999. The related applications are commonly assigned.

BACKGROUND SECTION

1. Field of the Invention

This invention relates generally to techniques for implementing electronic devices, and relates more particularly to a system and method for interactively utilizing a user interface to manage device resources.

2. Description of the Background Art

Implementing effective methods for managing device resources is a significant consideration for designers and manufacturers of contemporary electronic devices. However, effectively managing device resources may create substantial challenges for designers of electronic devices. For example, enhanced demands for increased device functionality and performance may require more system processing power, bus bandwidth, and require additional hardware resources. An increase in processing or hardware requirements may also result in a corresponding detrimental economic impact due to increased production costs and operational inefficiencies.

An electronic device in an electronic network may advantageously communicate with other electronic devices in the network to share resources to thereby substantially increase the capabilities and versatility of individual devices in the electronic network. For example, an electronic network may be implemented in a home environment to enable flexible and beneficial sharing of data and device resources between various consumer electronic devices, such as personal computers, digital video disc (DVD) devices, digital set-top boxes for digital broadcasting, enhanced television sets, and audio reproduction systems.

Network size is also a factor that affects the management of resources in an electronic network. Communications in an electronic network typically become more complex as the number of individual devices or nodes increases. A local software module on the local device may need to communicate with various remote software elements on remote devices across the electronic network. However, successfully managing resources of a substantial number of electronic devices across a network may provide significant benefits to a system user.

Furthermore, enhanced device capability to perform various advanced processes may provide additional benefits to a system user, but may also place increased demands on the control and management of an electronic device. For example, an enhanced electronic device that effectively accesses, processes, and displays digital television programming may benefit from efficient use of resources because of the large amount and complexity of the digital data involved.

In order to effectively manage device resources, a system user may benefit from the ability to observe and interactively control resource allocation in an electronic network. Due to growing demands on system resources and substantially increasing data magnitudes, it is apparent that developing new and effective methods for managing resources is a matter of importance for the related electronic technologies. Therefore, for all the foregoing reasons, implementing effective methods for managing resources remains a significant consideration for designers, manufacturers, and users of contemporary electronic devices.

SUMMARY

In accordance with the present invention, a system and method are disclosed for interactively utilizing a user interface to manage device resources. In one embodiment of the present invention, initially, device software preferably generates an isochronous process request to a cantaloupe manager that functions as a resource allocation manager for the electronic device. In response, the cantaloupe manager preferably accesses resource usages or resource requirements that are listed in one or more resource characterizations referred to herein as "cantaloupes". The resource usages in an accessed cantaloupe may preferably correspond to the foregoing isochronous process that was initially requested by the device software.

The cantaloupe manager then preferably may compare the resource usages from the cantaloupe(s) with currently-available resources of the electronic device. In certain embodiments, the cantaloupe manager may sequentially compare each individual resource usage from the cantaloupe with a corresponding current available resource of the electronic device.

If sufficient available resources are currently present for deterministic performance of the requested isochronous process as well as for deterministic performance of other existing isochronous processes, then the cantaloupe manager preferably authorizes the device software to instantiate the requested process through a picokernel module. However, if sufficient currently-available resources are not present for optimal execution of the requested isochronous process, then the cantaloupe manager preferably may take appropriate action such as generating a request-fail signal to the device software.

In accordance with the present invention, a user interface that is referred to herein as a "cantalometer" preferably displays relevant resource information from sources such as the cantaloupe(s) and/or the cantaloupe manager so that a system user may interactively analyze information from the cantalometer to effectively manage device resources. The cantalometer is preferably controlled and managed by a cantalometer manager software module.

In practice, initially, the cantalometer manager preferably displays current resources usages for an electronic device in a normal operational mode. The cantalometer manager then waits for an isochronous request from a system user or any other appropriate entity. If a request for a new isochronous task or process is generated, then the cantalometer manager and cantalometer preferably enter a request mode to display projected total resource usages for all existing processes, in addition to required resources for the requested task.

As discussed above, the cantaloupe manager then may determine whether sufficient device resources are available to accommodate the newly-requested isochronous task or process. If sufficient device resources are available, then the cantaloupe manager may preferably grant the new request, and the electronic device may instantiate the new task or process.

However, if sufficient device resources are not available, then, in accordance with the present invention, a system user preferably may make a decision to perform an interactive action for managing resources on the electronic device. For example, the system user may simply cancel the isochronous request. Alternately, the system user may select and cancel one or more existing tasks on the electronic device to thereby increase unallocated resources.

In addition, the system user may select to view an expanded cantalometer with various types of detailed and relevant information regarding resource allocation on the electronic device. The system user may then advantageously analyze the expanded cantalometer to make intelligent interactive decisions regarding the management of device resources. Finally, based upon the foregoing analysis of the expanded cantalometer information, the system user may intelligently select and cancel one or more existing tasks on the electronic device to thereby increase unallocated resources. The system user may thus sacrifice one or more existing tasks to thereby free device resources that are needed to instantiate the requested task.

In this manner, the present invention therefore advantageously provides and supports an improved user-interface mechanism, to thereby implement a system and method for interactively managing device resources.

DETAILED DESCRIPTION

The present invention relates to an improvement in electronic devices. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention comprises a system and method for interactively utilizing a user interface to manage device resources, and includes at least one resource characterization that stores resource requirements for executing a requested process. An allocation manager may then compare the resource requirements for the requested process to the currently-available device resources. The allocation manager may then authorize or deny the requested process depending upon whether the currently-available resources are sufficient to adequately service the resource requirements of the requested process. In accordance with the present invention, an interface manager may advantageously provide various relevant information from sources such as the resource characterization and the allocation manager for display upon a user interface to thereby allow a system user to interactively manage device resources.

Figure 1A:
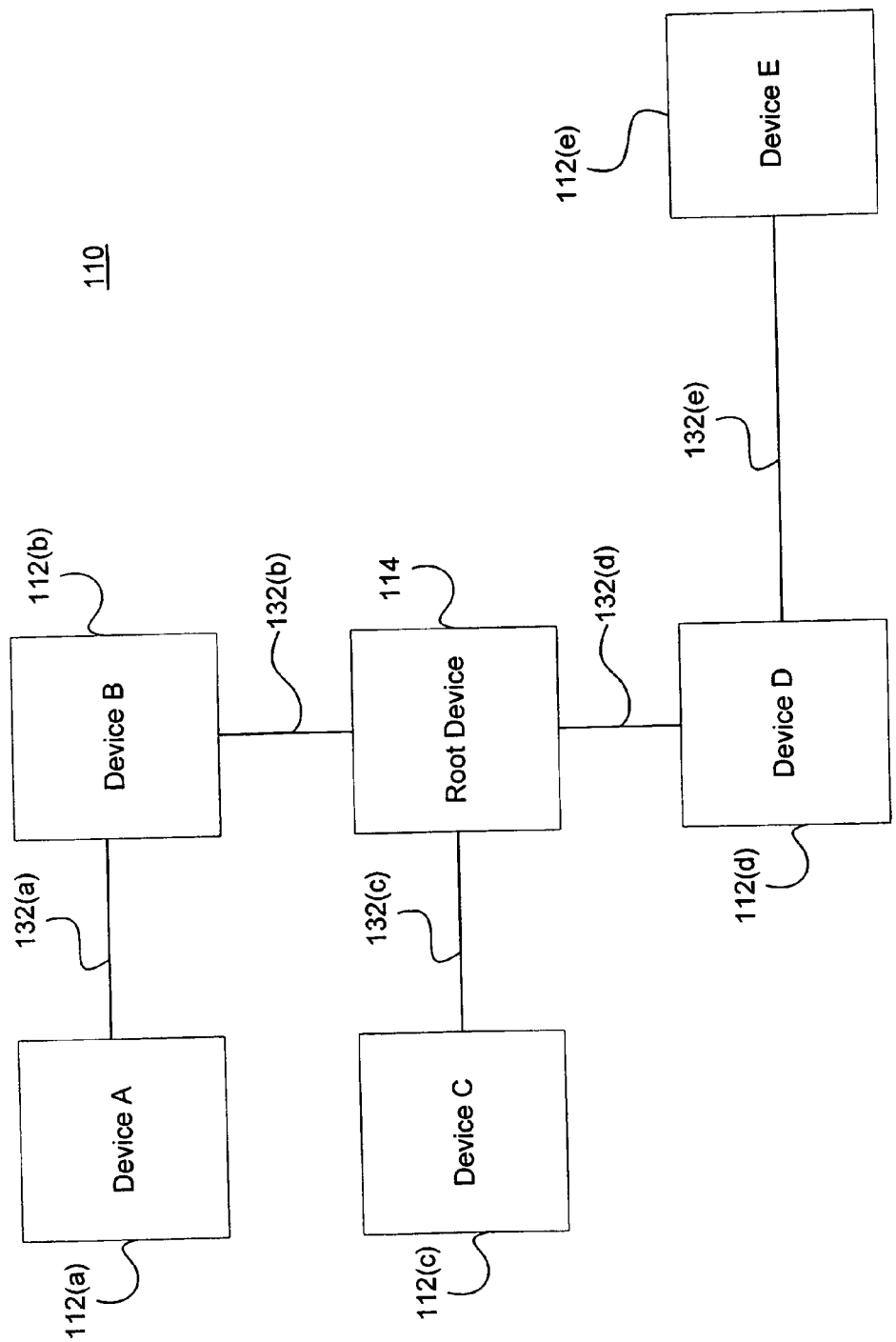
FIG. 1A is a block diagram for one embodiment of an electronic network, in accordance with the present invention.

Referring now to FIG. 1A, a block diagram for one embodiment of an electronic network 110 is shown, in accordance with the present invention. In the FIG. 1A embodiment, network 110 preferably comprises, but is not limited to, a number of electronic devices 112 (device A 112(a), device B 112(b), root device 114, device C 112(c), device D 112(d), and device E 112(e)). In alternate embodiments, electronic network 110 may readily be configured to include various other devices or components that function in addition to, or instead of, those discussed in conjunction with the FIG. 1A embodiment. In alternate embodiments, network 110 may readily be connected and configured in any other appropriate and suitable manner.

In the FIG. 1A embodiment, devices 112 of network 110 may be implemented as any type of electronic device, including, but not limited to, personal computers, printers, digital video disc devices, television sets, audio systems, video cassette recorders, and set-top boxes for digital broadcasting. In the FIG. 1A embodiment, devices 112 preferably communicate with one another using a network bus 132. Network bus 132 preferably includes path 132(a), path 132(b), path 132(c), path 132(d), and path 132(e). For example, in one embodiment, device B 112(b) is coupled to device A 112(a) via path 132(a), and to root device 114 via path 132(b). Similarly, root device 114 is coupled to device C 112(c) via path 132(c), and to device D 112(d) via path 132(d). In addition, device D 112(d) is coupled to device E 112(e) via path 132(e). In the FIG. 1A embodiment, network bus 132 is preferably implemented using an IEEE Std 1394 Standard for a High Performance Serial Bus, which is hereby incorporated by reference. However, in alternate embodiments, network 110 may readily communicate and function using various other network interconnectivity methodologies which are equally within the scope of the present invention.

In the FIG. 1A embodiment, each device in electronic network 110 may preferably communicate with any other device within network 110. For example, device E 112(e)

may communicate with device B 112(*b*) by transmitting transfer data via cable 132(*e*) to device D 112(*d*), which then may transmit the transfer data via cable 132(*d*) to root device 114. In response, root device 114 then may transmit the transfer data to device B 112(*b*) via cable 132(*b*). In the FIG. 1A embodiment, root device 114 preferably provides a master cycle start signal to synchronize isochronous processes for devices 112 in network 110. In other embodiments of network 110, any one of the network devices 112 may be designated as the root device or cycle master.

Figure 1B:
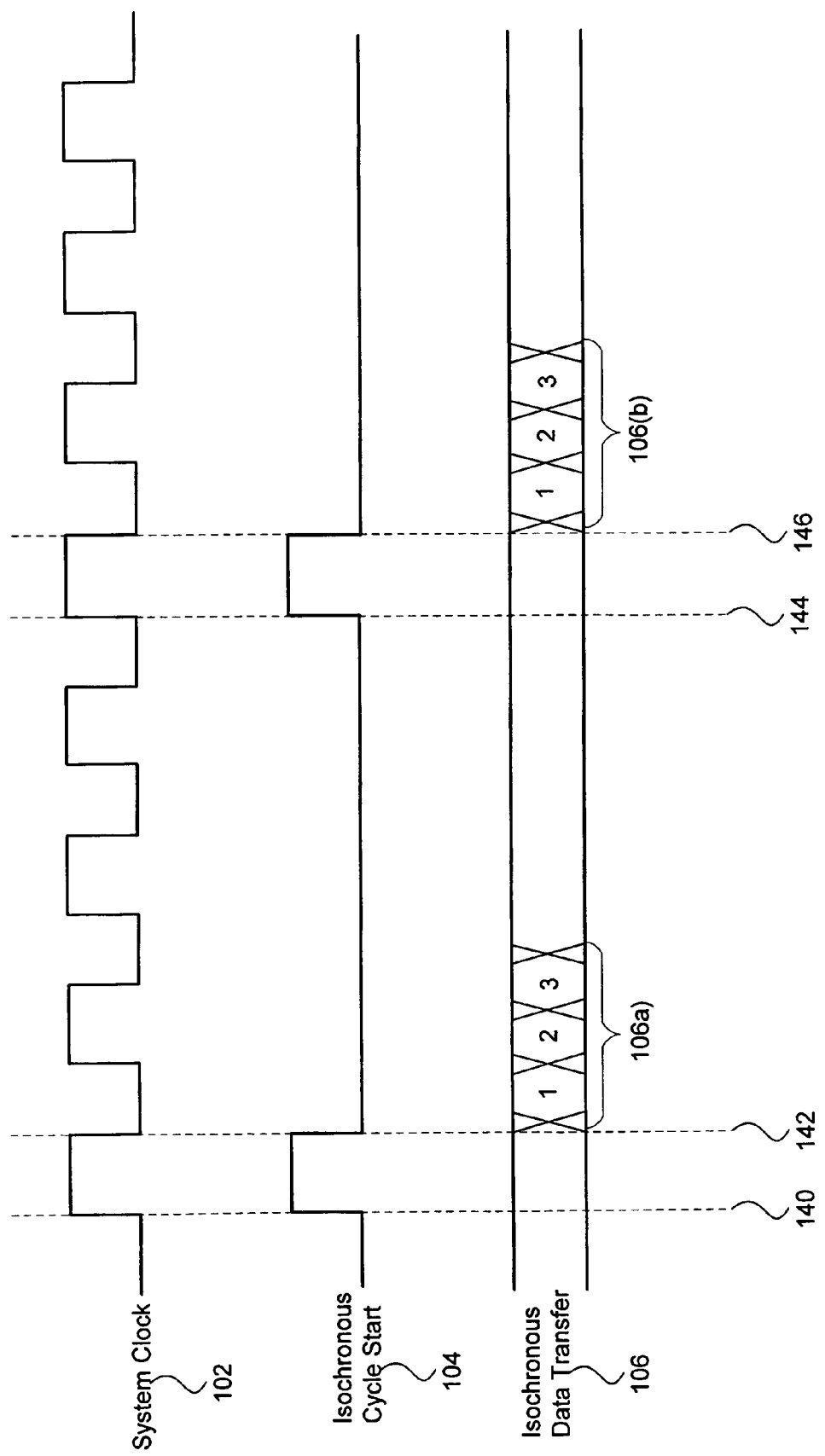
FIG. 1B is a timing diagram for one embodiment of exemplary isochronous data transfers, in accordance with one embodiment of the present invention.

Referring now to FIG. 1B, a timing diagram for exemplary isochronous data transfers is shown, in accordance with one embodiment of the present invention. The FIG. 1B timing diagram includes a system clock 102, an isochronous cycle start signal 104, and an isochronous data transfer signal 106. In FIG. 1B, at time 140, a first isochronous cycle start pulse changes state in synchronization with system clock 102. At time 142, the isochronous cycle start pulse changes state again, and isochronous data transfer 106(*a*) responsively occurs in a deterministic manner.

Similarly, at time 144, a second isochronous cycle start pulse changes state in synchronization with system clock 102. At time 146, the second isochronous cycle start pulse once more changes state, and isochronous data transfer 106(*b*) again occurs in a deterministic manner. Therefore, as illustrated in FIG. 1B, isochronous data transfers 106(*a*) and 106(*b*) typically occur at a pre-determined time and frequency in network 110. Furthermore, network 110 may cause isochronous data transfers 106(*a*) and 106(*b*) to occur before any asynchronous data transfers because of the time-sensitive nature of isochronous data.

Figure 2:
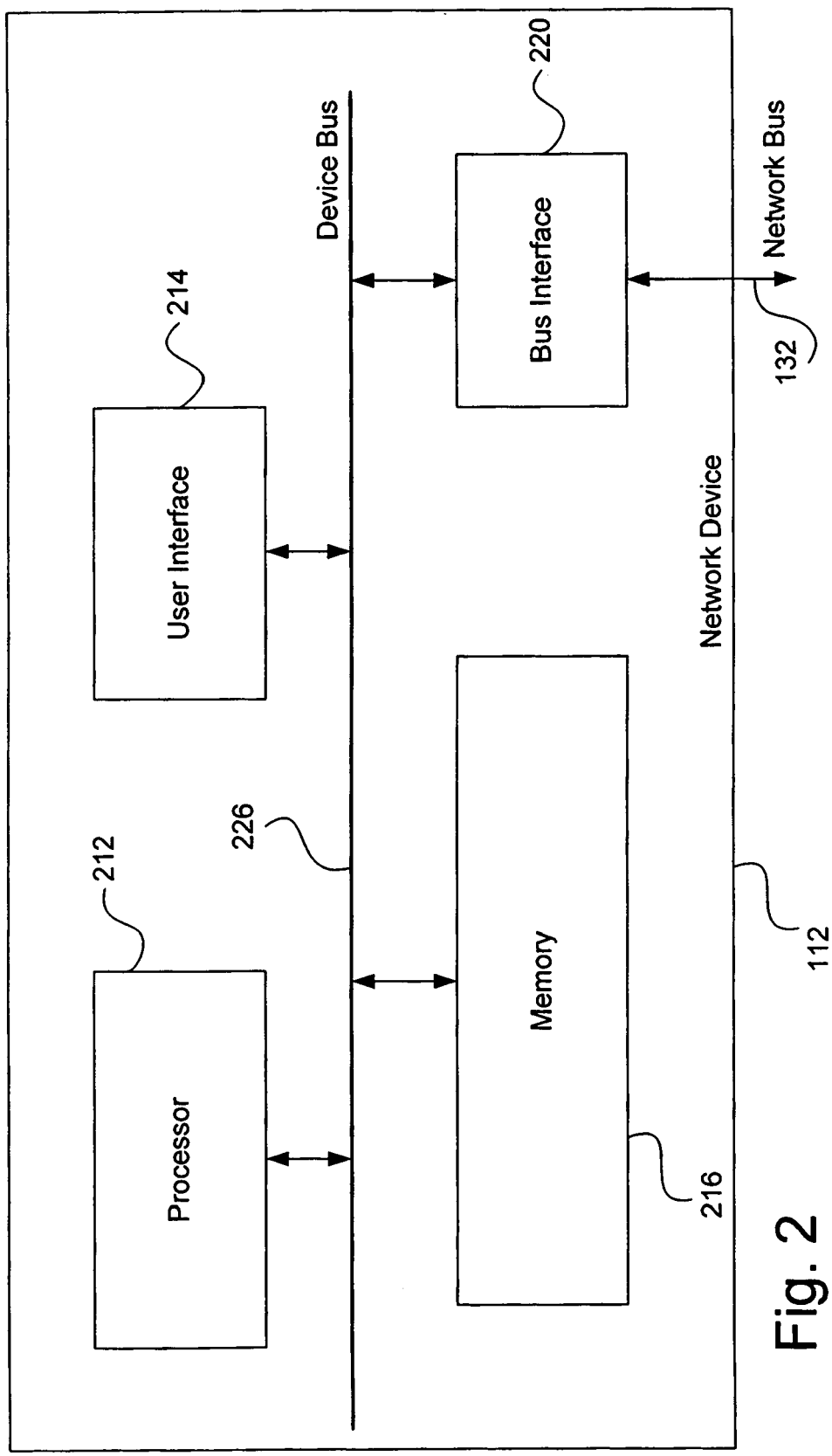
FIG. 2 is a block diagram for one embodiment of an exemplary device of FIG. 1A, in accordance with the present invention.

Referring now to FIG. 2, a block diagram for one embodiment of an exemplary device 112 from network 110 is shown, in accordance with the present invention. Device 112 preferably includes, but is not limited to, a processor 212, a user interface 214, a memory 216, a device bus 226, and a bus interface 220. Processor 212, user interface 214, memory 216 and bus interface 220 preferably are each coupled to, and communicate via common device bus 226.

In the FIG. 2 embodiment, processor 212 may be implemented as any appropriate multipurpose microprocessor device. Memory 216 may be implemented as one or more appropriate storage devices, including, but not limited to, read-only memory, random-access memory, and various types of non-volatile memory, such as floppy disc devices or hard disc devices. User interface 214 preferably may provide an interface for communications between a system user and device 112. User interface 214 may be implemented using any appropriate input and/or output devices. For example, user interface 214 may include one or more of a display monitor, a LED display, a keyboard device, or a remote control device.

In accordance with the present invention, bus interface 220 preferably provides an interface between device 112 and network 110. In the FIG. 2 embodiment, bus interface 220 preferably communicates with other devices 112 on network 110 via network bus 132. Bus interface 220 also preferably communicates with processor 212, user device 214, and memory 216 via a common device bus 226.

In the FIG. 2 embodiment, device 112 preferably includes the capability to perform various tasks that involve isochronous data and isochronous processes. Isochronous data typically includes information that is time-sensitive, and therefore requires deterministic operations to guarantee delivery and processing of the isochronous data in a timely manner. For example, video data that is intended for immediate display must arrive at the appropriate destination in a timely manner in order to prevent jitter or breakup of the corresponding image during display. To achieve this goal, device 112 preferably performs isochronous and other types of processing in segments of time called "cycles".

Scheduling of isochronous processes typically requires a finite time period that is sometimes referred to as "overhead". As the cycle time period is reduced, the overhead becomes a more significant factor because of the reduced amount of time remaining to perform the actual isochronous transfer. In the FIG. 2 embodiment, the cycle time period may be in the proximity of 125 microseconds, with a cycle frequency of approximately eight kilohertz.

Figure 3:
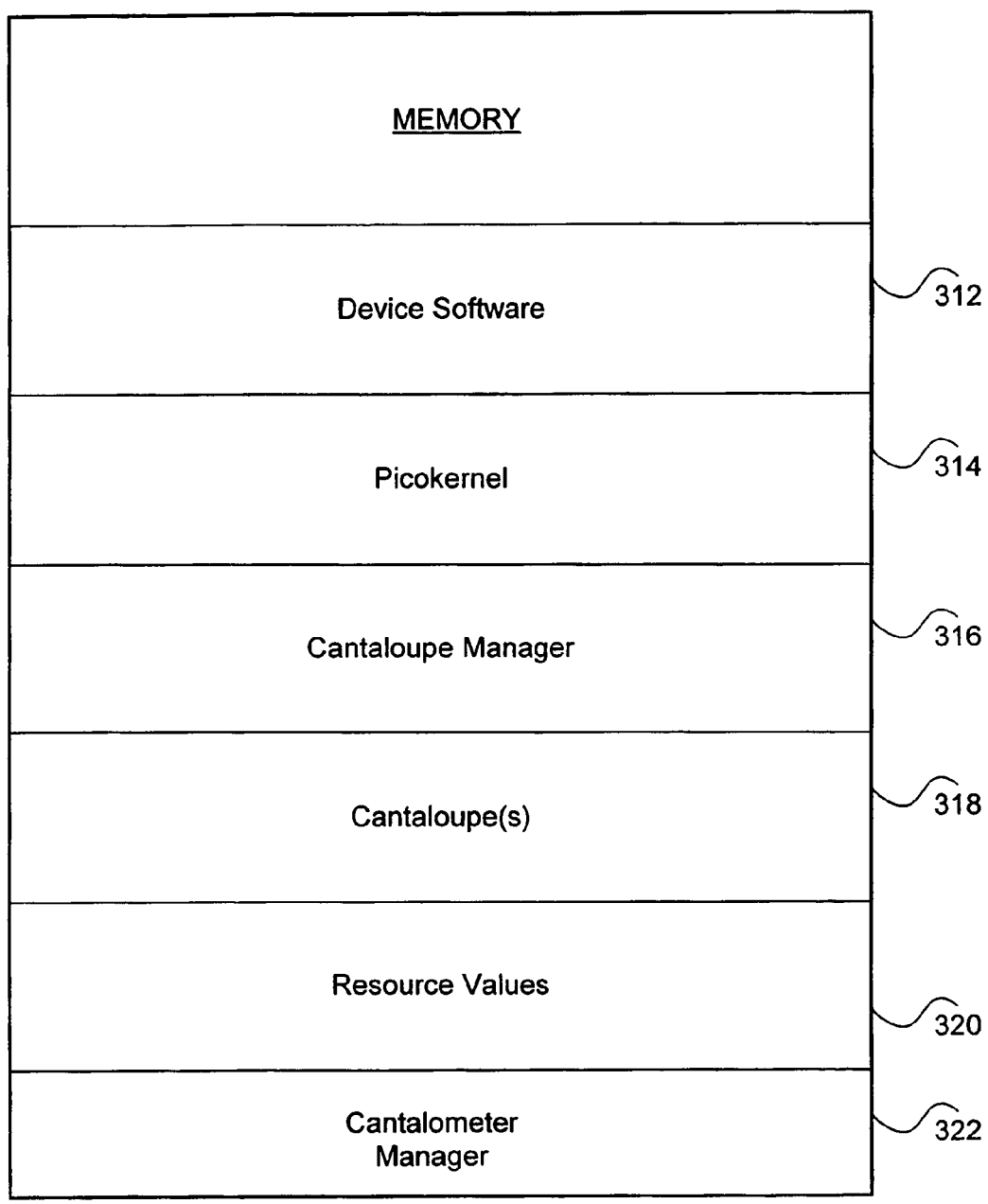
FIG. 3 is a diagram for one embodiment of the memory of FIG. 2, in accordance with the present invention.

Referring now to FIG. 3, a diagram for one embodiment of the FIG. 2 memory 216 is shown, in accordance with the present invention. In the FIG. 3 embodiment, memory 216 preferably includes, but is not limited to, device software 312, picokernel 314, cantaloupe manager 316, cantaloupe(s) 318, resource values 320, and cantalometer manager 322. In alternate embodiments, memory 216 may readily include various other components in addition to, or instead of, the components that are discussed in conjunction with the FIG. 3 embodiment.

In the FIG. 3 embodiment, device software 312 includes software instructions that are preferably executed by processor 212 for performing various functions and operations by device 112. The particular nature and functionality of device software 312 preferably varies depending upon factors such as the type and purpose of the corresponding host device 112.

In the FIG. 3 embodiment, picokernel 314 preferably controls and coordinates the scheduling of isochronous processes by utilizing an optimized process representation to reduce the cost or overhead of scheduling to a minimum. Cantaloupe manager 316 preferably includes an allocation manager that may utilize information from cantaloupe(s) 318 and/or from interactive user input to determine whether a particular isochronous process may be instantiated on behalf of another entity, such as device software 312 or a system user. Cantaloupe(s) 318 preferably comprises a resource characterization that includes one or more characterizations of hardware and/or software resources necessary to meet performance criteria for a particular isochronous process. Cantaloupe(s) 318 are further discussed below in conjunction with FIGS. 5 through 7.

Resource values 320 preferably include any relevant information regarding current resource availability and allocations in device 112. For example, in the FIG. 3 embodiment, resource values 320 may include one or more available resource value(s), one or more allocated resource value(s), and one or more total device resource value(s) for device 112. In the FIG. 3 embodiment, prior to allocation of any resources, the available resource value(s) may initially be set to a value that is less than 100% of total device resource values (such as 75%) to thereby reserve resources necessary for non-isochronous processes or system tasks.

In accordance with the present invention, cantalometer manager 322 preferably includes software instruction that are executed by processor 212 to advantageously cooperate with cantaloupe manager 316 and cantaloupes 318 to thereby obtain and present information from cantaloupes 318 for interactive use by a system user. The functionality of cantalometer manager 322 is further discussed below in conjunction with FIGS. 8 through 12.

Figure 4:
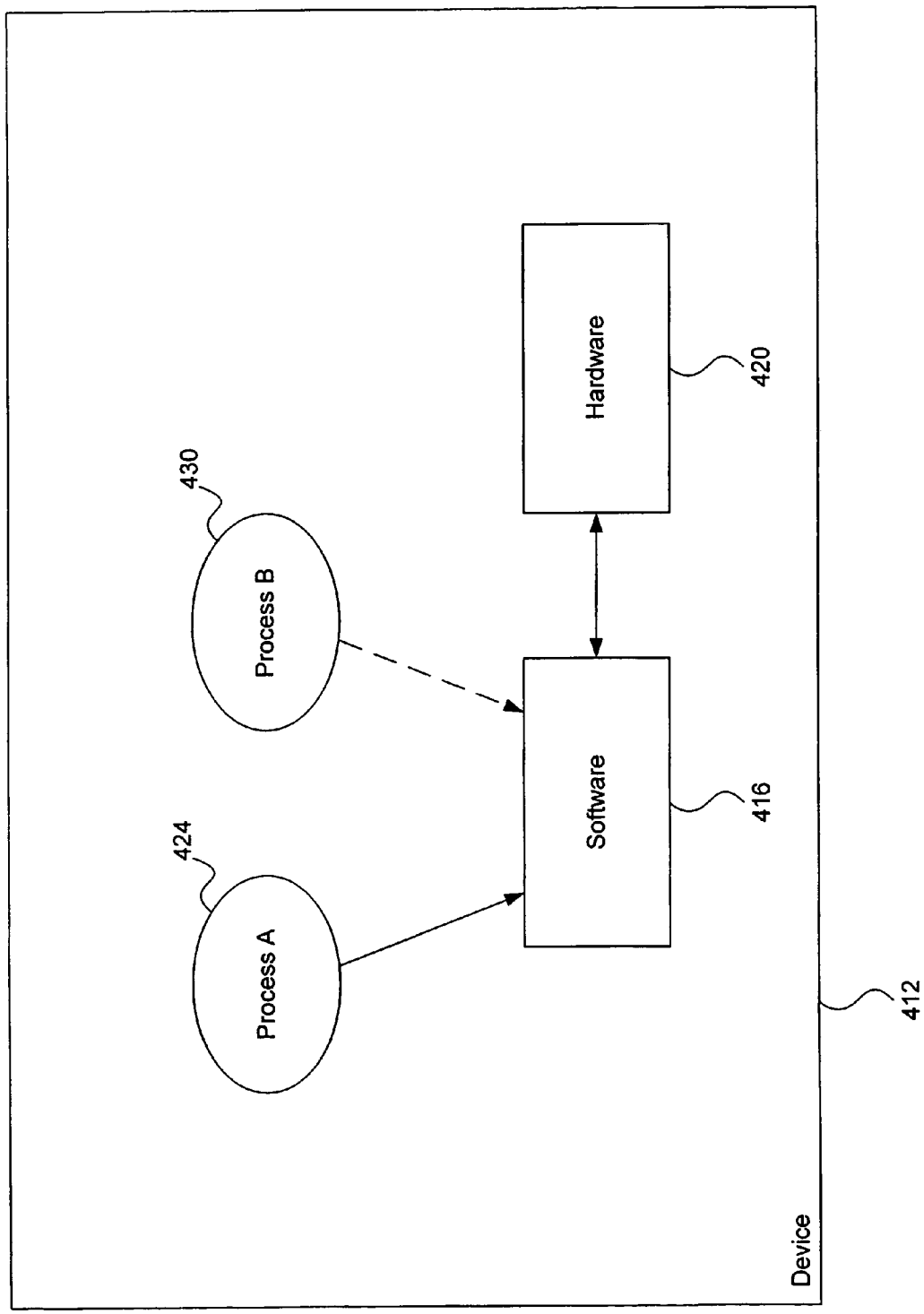
FIG. 4 is a block diagram that illustrates non-optimal performance in an electronic device.

Referring now to FIG. 4, a block diagram that illustrates non-optimal performance in an exemplary electronic device 412 is shown. In the FIG. 4 embodiment, device 412 preferably instantiates a process A 424 that is performed using software 416 and hardware 420. For example, process A 424 may consume 75% of the total resources available on device 412 to decode and display video programming. In the FIG. 4 embodiment, device 412 then preferably instantiates a process B 430 that is performed using software 416 and hardware 420. For example, process B 430 may require 35% of the total resources available on device 412 to perform a speech recognition function.

Simultaneously executing process A 424 (using 75% of total available resources) and process B 430 (using 35% of total available resources) requires more than 100% of the total resources available from device 412 (75%+35%=110%). Therefore, insufficient resources are available for simultaneously executing process A 424 and process B 430. Device 412 may attempt to simultaneously execute process A 424 and process B 430 by reducing the amount of resources provided to one or both of the simultaneously-executing processes.

Executing a particular process without providing sufficient resources may result in non-optimal performance or "graceful degradation". For example, if process A 424 lacks sufficient resources for successful performance, such graceful degradation may include the disruption of video information that is being displayed to a system viewer. In many circumstances, such degradation of device performance is not desirable or acceptable as a performance model for many electronic devices.

Figure 5:
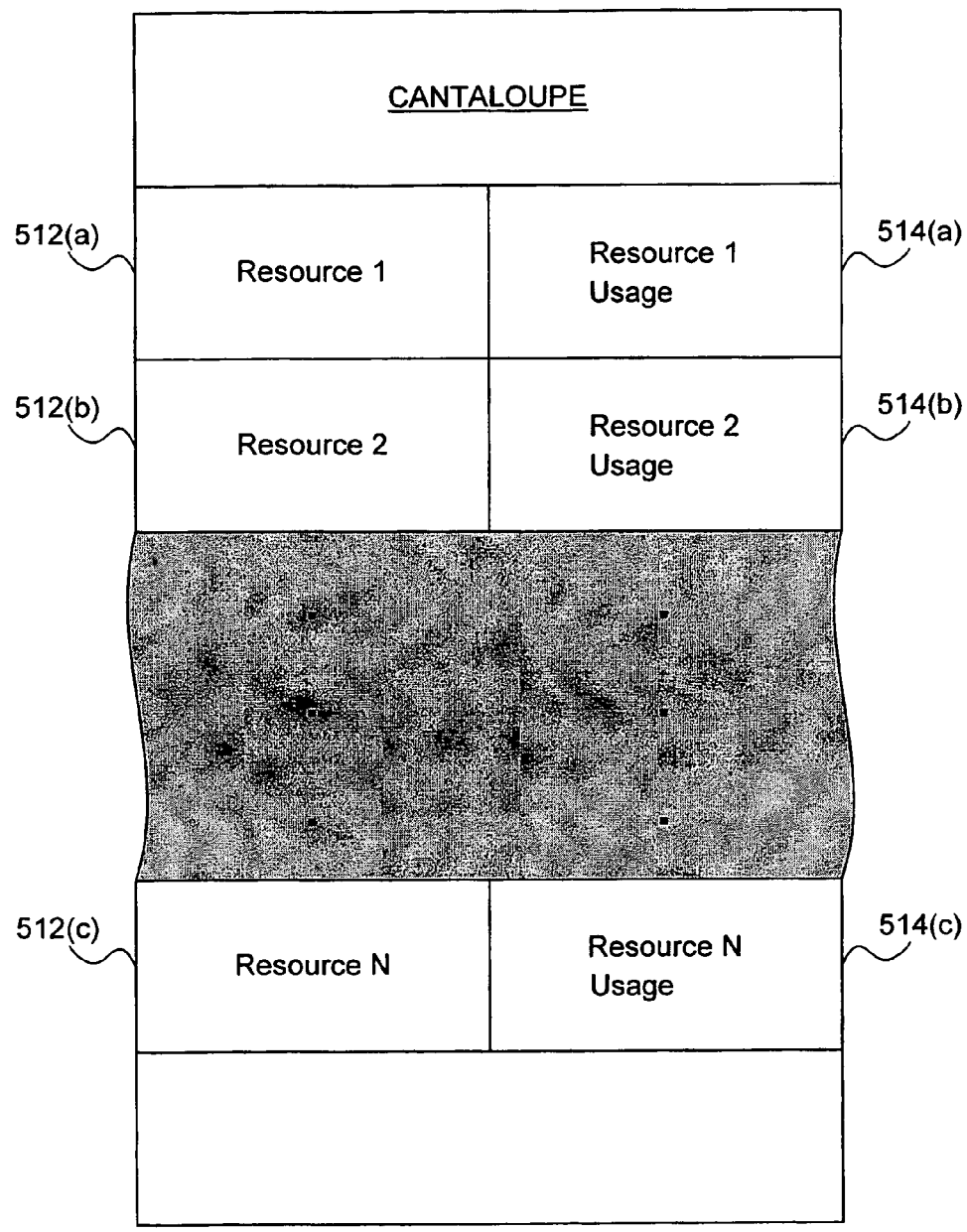
FIG. 5 is a block diagram for one embodiment of a cantaloupe, in accordance with the present invention.

Referring now to FIG. 5, a diagram for one embodiment of a cantaloupe 318 is shown, in accordance with the present invention. In the FIG. 5 embodiment, cantaloupe 318 preferably includes a listing for a resource 1 (512(*a*)) through a listing for a resource N (512(*c*)). In the FIG. 5 embodiment, resources 512 may include any appropriate aspects of devices 112 or network 110 (FIG. 1). For example, resource 512 may correspond to the bandwidth for a particular bus, such as device bus 226 or network bus 132. Similarly, resource 512 may correspond to the processing capacity for a central processing device, such as processor 212 (FIG. 2), or to the capacity of a memory device, such as memory 216. In alternate embodiments of the present invention, cantaloupe 318 may readily be implemented to include various other configurations, and may also include various items and components that are different from those discussed in conjunction with the FIG. 5 embodiment.

In accordance with the present invention, cantaloupe 318 is preferably associated with a particular time-sensitive isochronous process or task on network 110. Prior to instantiating the foregoing process or task, cantaloupe manager 316 may then advantageously reference cantaloupe 318 to determine the individual and total resources necessary for the associated process or task. Determining in advance whether sufficient system resources are available for successful operation of a given process or task ensures that the associated isochronous process or task is guaranteed sufficient resources for timely and deterministic performance. Providing sufficient resources becomes more significant as the cycle duration decreases and the cycle frequency increases.

In the FIG. 5 embodiment, cantaloupe 318 preferably also includes a listing for a resource 1 usage (514(*a*)) through a listing for a resource N usage (514(*c*)). In the FIG. 5 embodiment, each of resource usages 514 preferably corresponds with a given resource 512 to characterize the amount of the given resource 512 is required by the isochronous process or task associated with cantaloupe 318.

For example, if a given resource 512 is the bandwidth for a particular bus, then the corresponding resource usage 514 may be expressed in bandwidth units utilized by a process or task. Similarly, if a given resource 512 is the processing capacity for a central processing device, then corresponding resource usage 514 may be expressed in CPU units, such as machine-instructions per second (MIPS). In various embodiments of the present invention, resource usages 514 may be implemented in any appropriate and compatible format for use by network 110. In certain embodiments, cantaloupe 318 may also be utilized to characterize other resources, such as the total system resources, or the current available resources of device 112.

Therefore, cantaloupe 318 preferably includes an at least two-dimensional array of descriptive parameters. The first parameter preferably may be the type of resource being characterized, and the second parameter is the amount of required resource usage. A cantaloupe 318 may thus serve as a common descriptor to couple hardware and software scheduling mechanisms by describing resource requirements. For example, resource usage may be characterized and described as a ratio of the amount of usage per a given time period (including process scheduling overhead).

Figure 6:
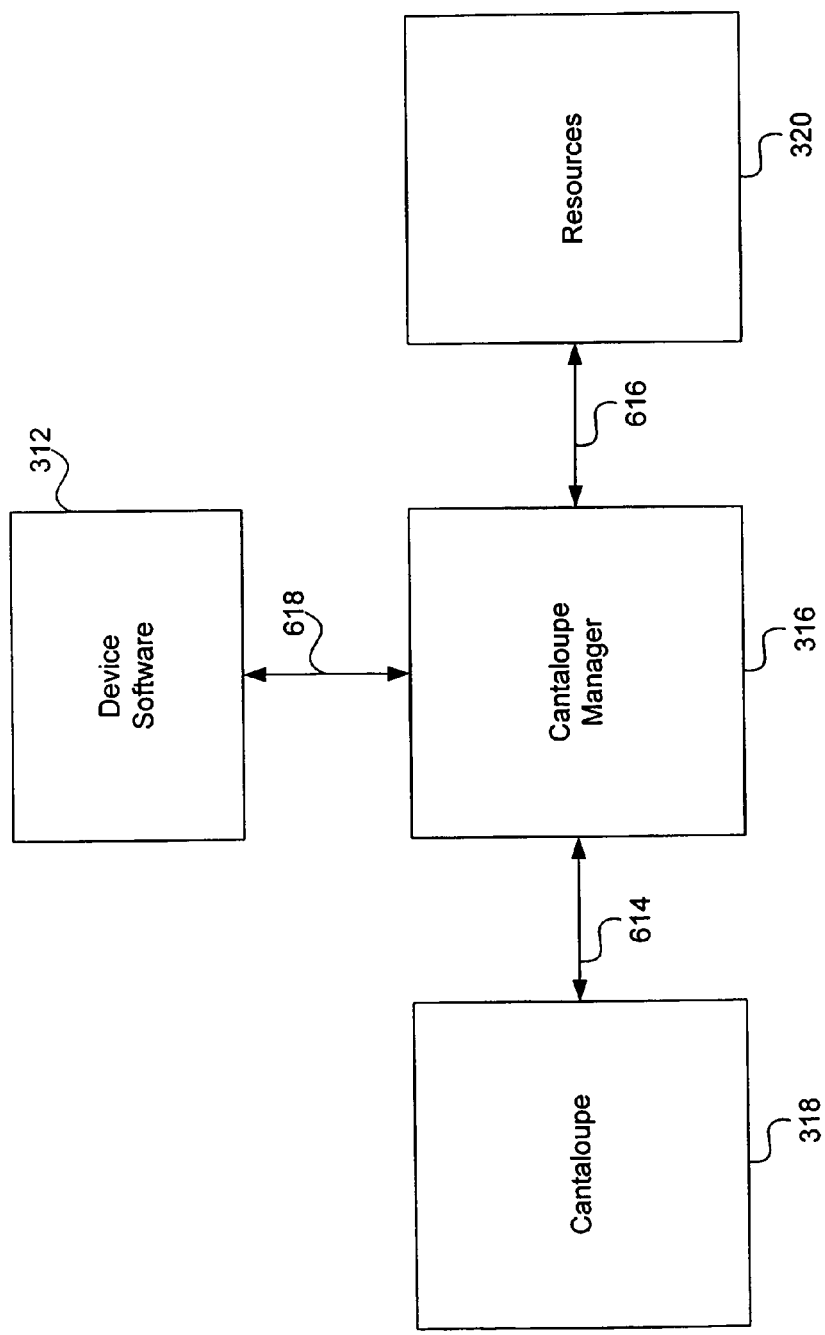
FIG. 6 is a block diagram that illustrates a resource allocation procedure, in accordance with one embodiment of the present invention.

Referring now to FIG. 6, a block diagram illustrating the use of cantaloupe 318 is shown, in accordance with one embodiment of the present invention. In alternate embodiments, cantaloupe 318 may readily be utilized in various other manners and configurations, in accordance with the present invention.

In the FIG. 6 embodiment, device software 312 initially generates an isochronous process request to cantaloupe manager 316 via path 618. In response, cantaloupe manager 316 preferably accesses the resource usages 514 in cantaloupe 318 via path 614. In the FIG. 6 embodiment, cantaloupe 318 preferably corresponds to the foregoing isochronous process or task that was initially requested by device software 312.

Cantaloupe manager 316 then preferably compares the resource usages 514 from cantaloupe 318 with the device capacity of available resources 320 for the requested process via path 616. In the FIG. 6 embodiment, cantaloupe manager 316 may sequentially compare each individual resource usage 514 from cantaloupe 318 with a corresponding currently-available associated system resource 320.

If sufficient additional current resources 512 are available for the requested isochronous process, then cantaloupe manager 316 preferably authorizes device software 312 to schedule and instantiate the requested process through picokernel 314. However, if sufficient current resources 512 are not available for the requested isochronous process, then cantaloupe manager 316 preferably generates a request fail signal to device software 312. In this manner, the present invention advantageously pre-allocates sufficient resources for a given isochronous process, prior to instantiation, to thereby guarantee successful and deterministic performance of the isochronous process.

In accordance with the present invention, cantalometer manager 322 (FIG. 3) may advantageously access and display information from cantaloupe 318 to facilitate interactive management of resources 320 by a system user. The functionality of cantalometer manager 322 is further discussed below in conjunction with FIGS. 8 through 12.

Figure 7:
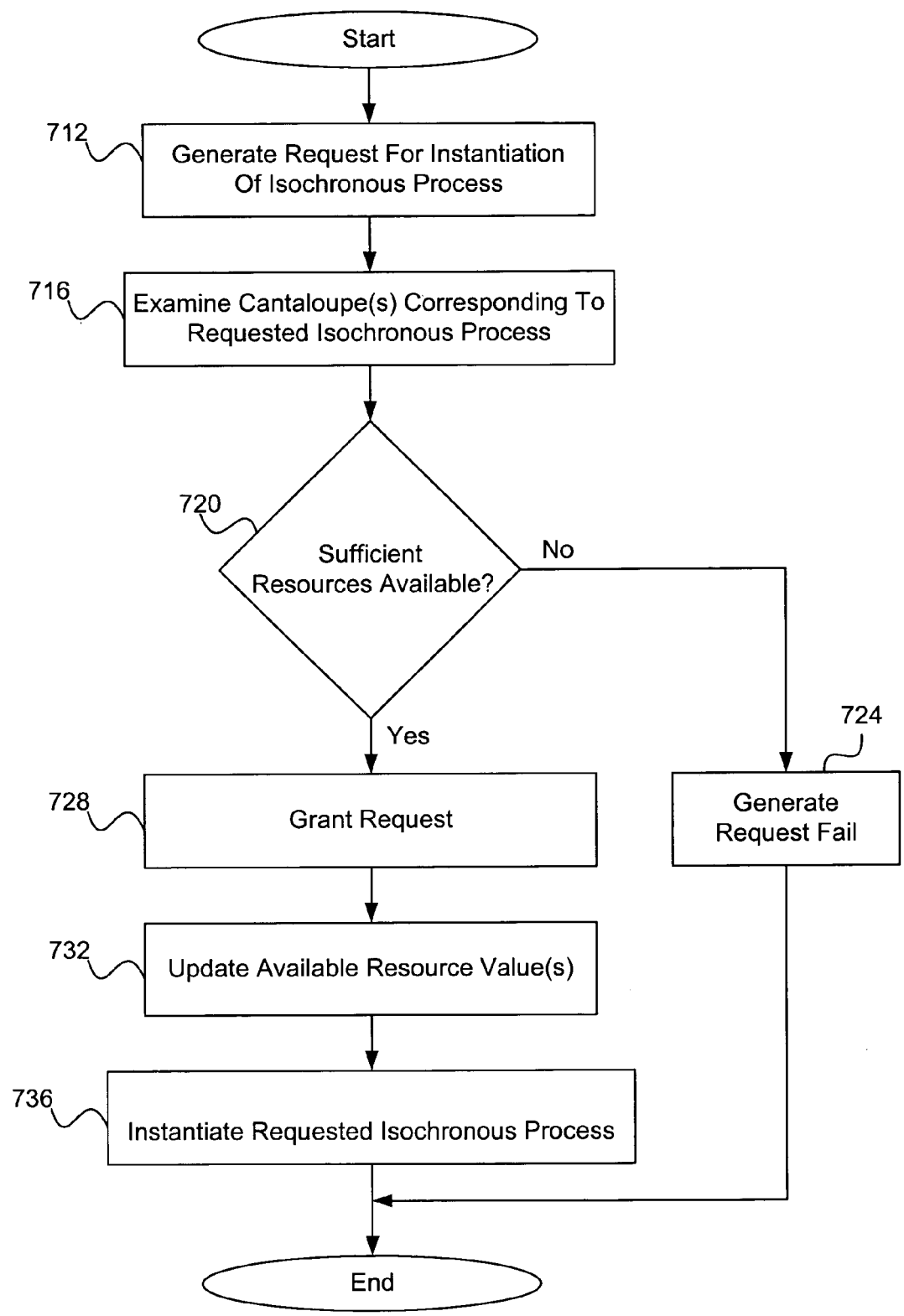
FIG. 7 is a flowchart of method steps for performing a resource allocation procedure, in accordance with one embodiment of the present invention.

Referring now to FIG. 7, a flowchart of method steps for performing a resource allocation procedure is shown, in accordance with one embodiment of the present invention. In alternate embodiments, the FIG. 7 resource allocation procedure may readily be performed in various other manners and sequences, in accordance with the present invention.

In the FIG. 7 embodiment, initially, in step 712, an entity (such as device software 312 or a system use) preferably generates a request for instantiation of an isochronous process or task. In response, in step 716, cantaloupe manager 316 preferably examines one or more cantaloupes 318 that correspond to the requested isochronous process or task.

In step 720, cantaloupe manager 316 preferably determines whether sufficient resources are currently available for performing the requested isochronous process or task. In accordance with the present invention, cantaloupe manager 316 may utilize any appropriate technique to determine whether sufficient resources are available for performing the requested process or task.

In the FIG. 7 embodiment, cantaloupe manager 316 preferably maintains one or more available resource values in resource values 320 of memory 216 (FIG. 3) to quantitatively represent any currently unallocated resources. For example, available resource values may be expressed as percentages of total system resources, or as a finite resource amount. Cantaloupe manager 316 may then compare the resources required for the requested process (obtained from cantaloupe(s) 318) and the currently-available resource value(s) to determine whether sufficient unallocated resources are available for utilization by the requested process.

In step 720, if cantaloupe manager 316 determines that sufficient resources are not available for performing the requested process, then, in step 724, cantaloupe manager 316 preferably generates a request fail signal, and the FIG. 7 method terminates. In accordance with the present invention, a system user may responsively utilize a user interface device named a "cantalometer" to interactively manager device resources on device 112. The implementation and functionality of cantalometers is further discussed below in conjunction with FIGS. 8–12.

In foregoing step 720, if cantaloupe manager 316 determines that sufficient resources are available for performing the requested process, then, in step 728, cantaloupe manager 316 preferably allocates the required resources, and grants the request for instantiation of the isochronous process.

In step 732, cantaloupe manager 316 preferably updates the available resource value(s) in memory 216 to include the resources that were allocated in foregoing step 728 to service the requested isochronous process. For example, if the requested process requires twenty-five percent of system resources, then, cantaloupe manager 316 preferably may decrease the available resource value in memory 216 by twenty-five percent. Finally, in step 736, picokernel 314 of device 112 preferably may instantiate and execute the requested isochronous process. The resources that are allocated for the isochronous process are therefore guaranteed to be available, and the isochronous process is thus assured of successful execution without degraded or non-optimal performance. In accordance with the present invention, the FIG. 7 process may readily be utilized to evaluate a series of requested isochronous processes or tasks.

Figure 8:
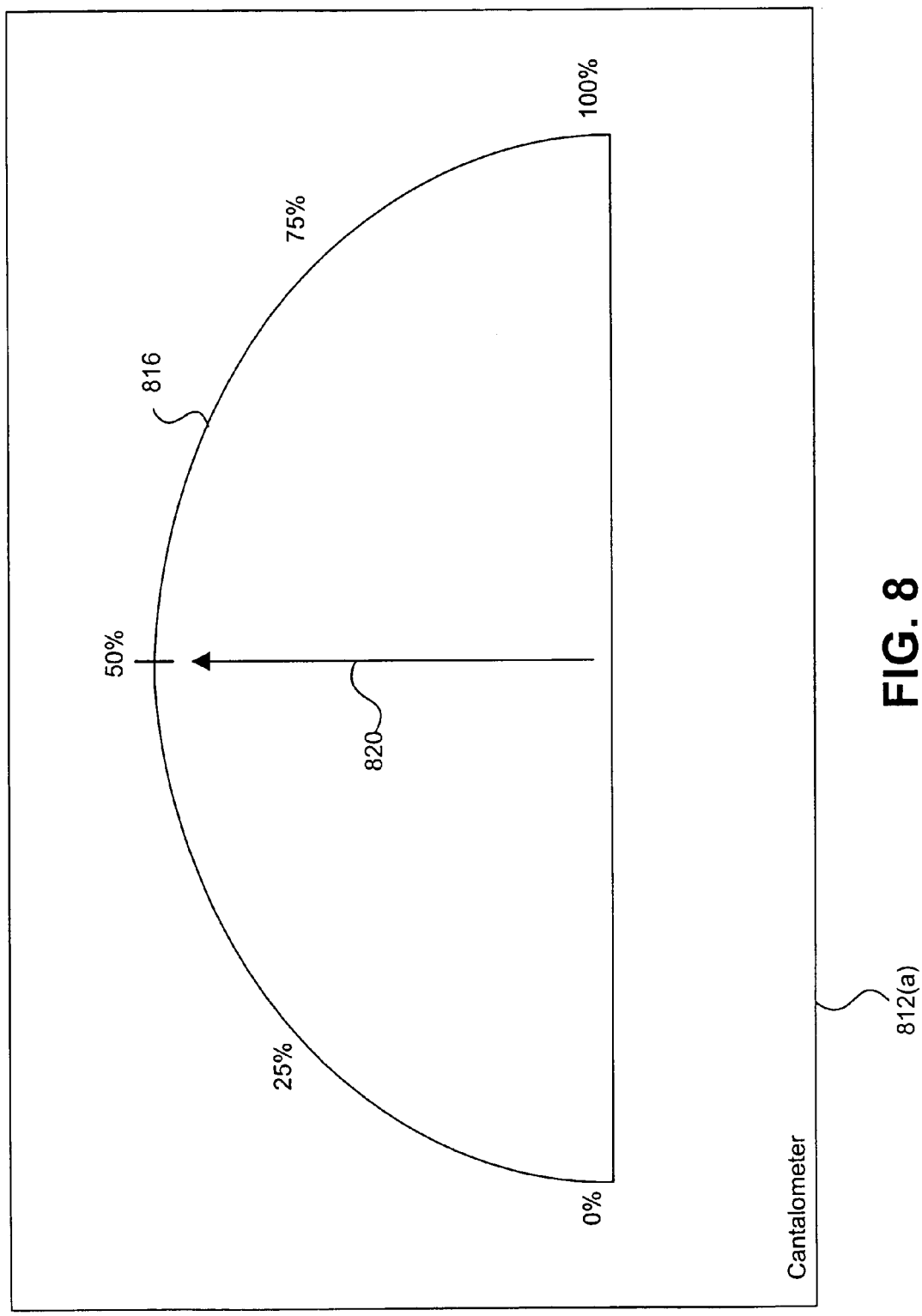
FIG. 8 is a diagram for one embodiment of a standard cantalometer, in accordance with the present invention.

Referring now to FIG. 8, a diagram for one embodiment of a standard cantalometer 812(*a*) is shown, in accordance with the present invention. In the present application, references to a "cantalometer" preferably designate any means or technique for implementing a user interface to thereby provide a representation of information from cantaloupe 318, cantaloupe manager 316, or any other relevant source or entity.

In the FIG. 8 embodiment, standard cantalometer 812(*a*) preferably includes, but is not limited to, a resource scale 816 and a current resource indicator 820. In alternate embodiments of the present invention, cantalometer 812(*a*) may readily be implemented to include various other configurations, and may also include various items and components that are different from those discussed in conjunction with the FIG. 8 embodiment.

In the FIG. 8 embodiment, cantalometer 812(*a*) may be displayed as part of the user interface 214 for device 112 (FIG. 2) to facilitate interactive management of device resources by a system user. In alternate embodiments, cantalometer 812(*a*) may be implemented using any appropriate and effective technique. For example, a cost-effective embodiment of cantalometer 812(*a*) may include a simple LED bar graph that is mounted on the exterior of an electronic device such as a set-top box or an audio-visual device.

In operation, cantalometer manager 322 preferably obtains relevant information for display on cantalometer 812(*a*) from various sources such as cantaloupes 318 and cantaloupe manager 316. In the FIG. 8 embodiment, standard cantalometer 812(*a*) may preferably be utilized during a normal operational mode of device 112 to represent the current total resource usage of device 112. Resource scale 816 preferably includes appropriate indicia to represent current total resource usage as a percentage of total available resources on device 112. In the FIG. 8 embodiment, current resource indicator 820 is positioned for displaying to a system user that approximately 50% of device resources are currently registered in cantaloupes 318 as being allocated for various isochronous processes or tasks.

Figure 9:
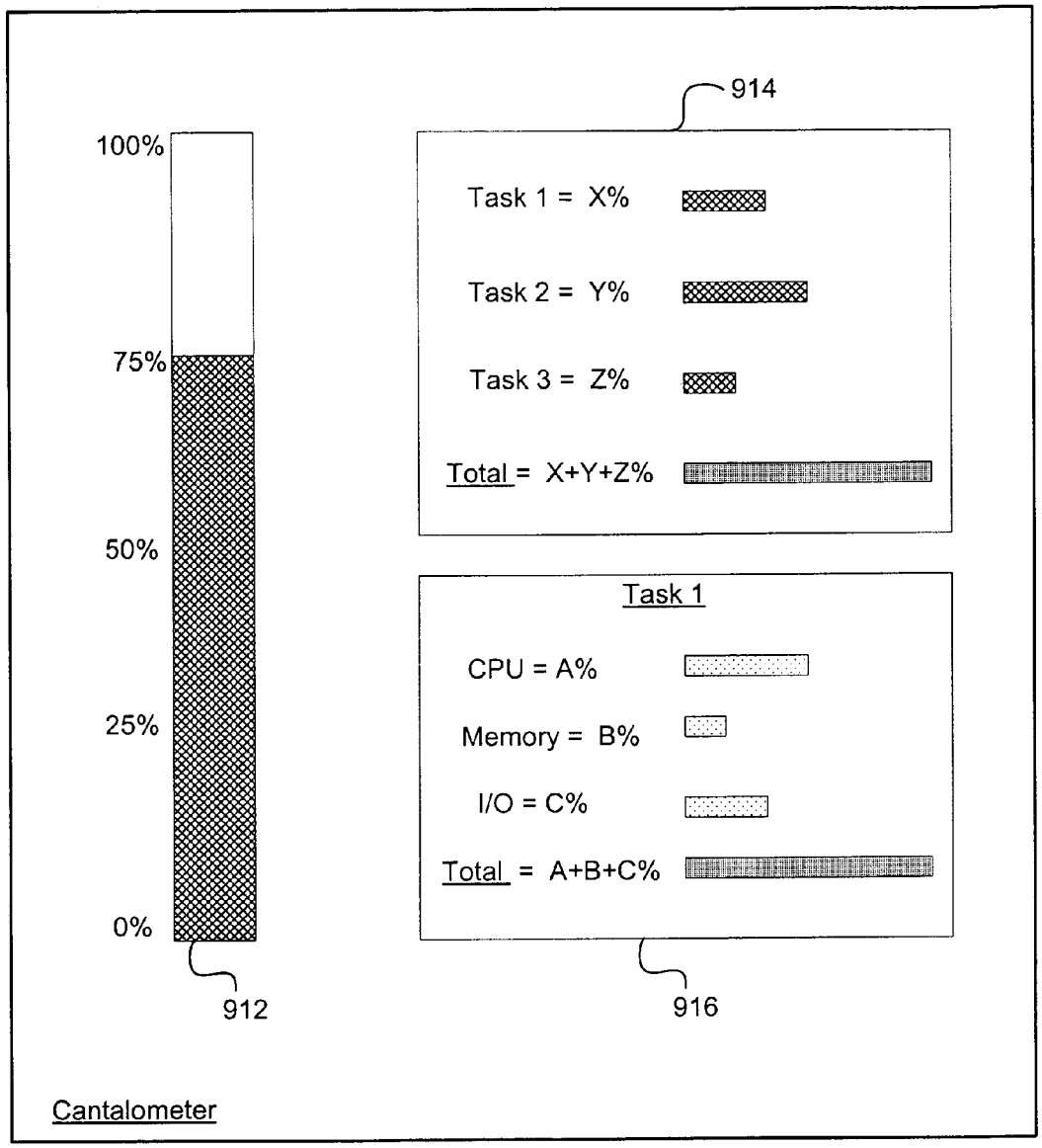
FIG. 9 is a diagram for one embodiment of an expanded cantalometer, in accordance with the present invention.

Referring now to FIG. 9, a diagram for one embodiment of an expanded cantalometer 812(*b*) is shown, in accordance with the present invention. In the FIG. 9 embodiment, expanded cantalometer 812(*b*) preferably includes, but is not limited to, a resource scale 912, a task summary display 914, and a task details display 916. In alternate embodiments of the present invention, expanded cantalometer 812(*b*) may readily be implemented to include various other configurations, and may also include various items and components that are different from those discussed in conjunction with the FIG. 9 embodiment.

In the FIG. 9 embodiment, cantalometer 812(*b*) may be displayed as part of the user interface 214 for device 112 (FIG. 2) to facilitate interactive management of device resources by a system user. In alternate embodiments, cantalometer 812(*b*) may be implemented using any appropriate and effective technique. Cantalometer manager 322 preferably obtains detailed information for display on expanded cantalometer 812(*b*) from sources such as cantaloupes 318 and cantaloupe manager 316. In the FIG. 9 embodiment, expanded cantalometer 812(*b*) may preferably be utilized to represent the current total resource usage of device 112 and further relevant details regarding resource allocation and resource usage on device 112.

Resource scale 912 preferably includes appropriate indicia to represent current total resource usage as a percentage of total available resources on device 112. In the FIG. 9 embodiment, resource scale 912 is shaded to display to a system user that approximately 75% of device resources are currently registered in cantaloupes 318 as being allocated for various isochronous processes or tasks.

In the FIG. 9 embodiment, task summary display 914 preferably may include information regarding each of the individual isochronous tasks or processes that are currently active on device 112. For example, as shown in FIG. 9, each task listing in task summary display 914 may include a task resource-usage percentage and a corresponding task resource-usage representation to indicate the percentage of total available device resources that a given task or process has been allocated. In addition, task summary display 914 may include a total resource-usage percentage and a corresponding total resource-usage representation for the total percentage of available device resources that all tasks and processes have been allocated.

In the FIG. 9 embodiment, task details display 916 preferably may include detailed information regarding any of the individual isochronous tasks or processes that are currently active on device 112. The detailed information may analyze the individual resources used for one or more selected tasks or processes. For example, each resource listing in task details display 916 may include a resource usage percentage and a corresponding resource usage representation to indicate the percentage of a particular total available device resource that is consumed by a given task. In addition, task details display 916 may include a total task usage percentage and a corresponding total task usage representation to indicate the total percentage of available device resources that are consumed by a selected task. In certain embodiments, task details display 916 may alternately provide detailed information corresponding to individual resources for multiple allocated isochronous tasks or processes.

Figure 10:
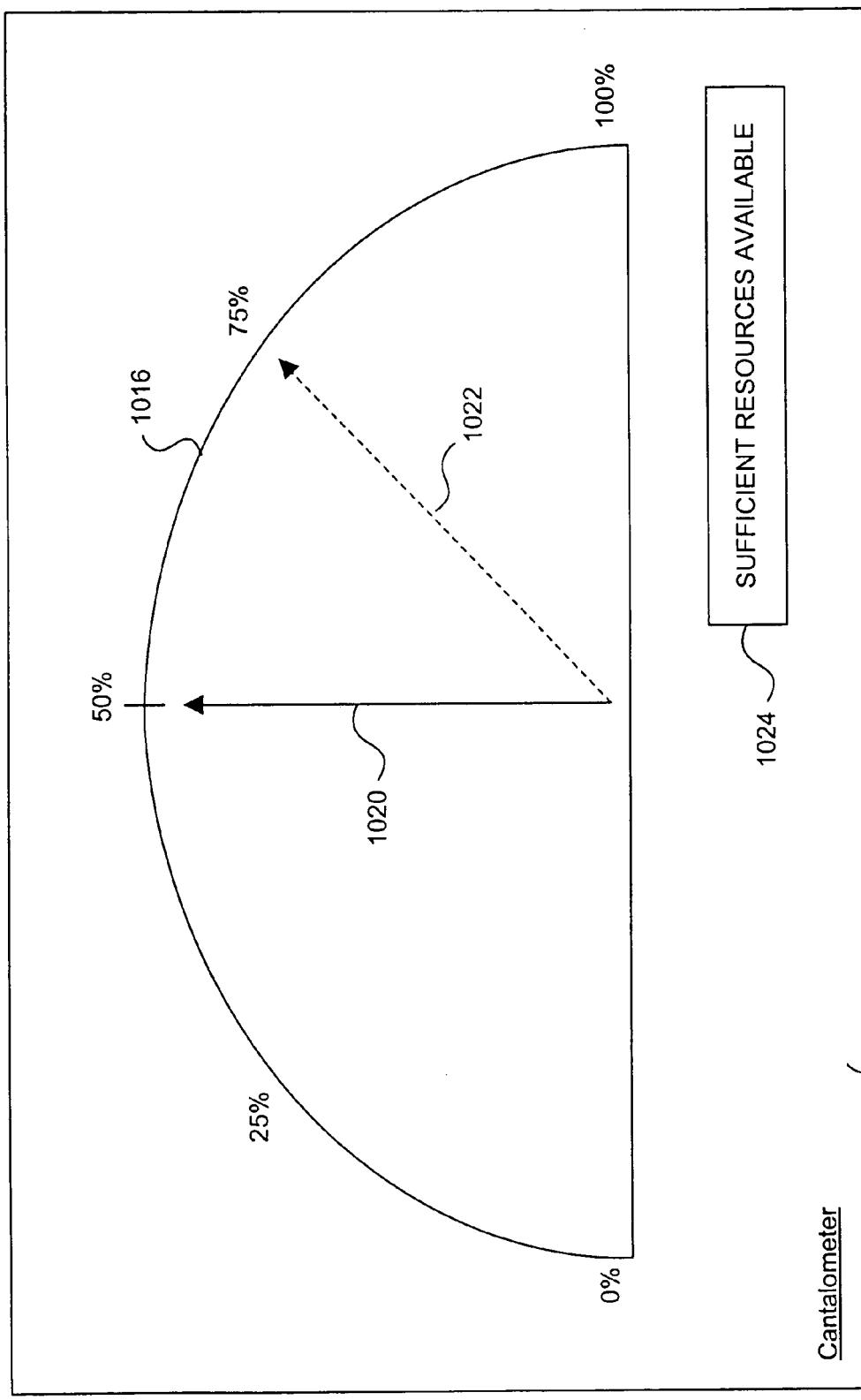
FIG. 10 is a diagram for one embodiment of a cantalometer in a request mode, in accordance with the present invention.

Referring now to FIG. 10, a diagram for one embodiment of a cantalometer 812(*c*) in a request mode is shown, in accordance with the present invention. In the FIG. 10 embodiment, cantalometer 812(*c*) preferably includes, but is not limited to, a resource scale 1016, a current resource indicator 1020, a projected resource indicator 1022, and a request result field 1024. In alternate embodiments of the present invention, cantalometer 812(*c*) may readily be implemented to include various other configurations, and may also include various items and components that are different from those discussed in conjunction with the FIG. 10 embodiment.

In the FIG. 10 embodiment, cantalometer 812(*c*) may be displayed as part of the user interface 214 for device 112 (FIG. 2) to facilitate interactive management of device resources by a system user. Cantalometer manager 322 preferably obtains relevant information for display on cantalometer 812(*c*) from various sources such as cantaloupes 318 and cantaloupe manager 316.

In the FIG. 10 embodiment, cantalometer 812(*c*) may preferably be utilized during a request mode of device 112 to represent a projected total resource usage for device 112 for the condition that a user request for a new isochronous task was granted and the requested task was instantiated on device 112. In the FIG. 10 embodiment, resource scale 1016 preferably includes appropriate indicia to represent total device resource usage as a percentage of total available device resources on device 112. In the FIG. 10 embodiment, current resource indicator 1020 is positioned to display to a system user that approximately 50% of device resources are currently registered in cantaloupes 318 as being allocated for various active isochronous processes or tasks.

In addition, in FIG. 10, projected resource indicator 1022 is positioned to display to a system user that a particular newly-requested isochronous task that requires approximately 25% of total device resources would result in a total projected resource consumption of approximately 75%. In certain embodiments, cantalometer 812(*c*) may be divided into several regions of contrasting color, shading, or texture to more clearly demarcate the different sections of cantalometer 812(*c*). For example, the region to the left of current resource indicator 1020 may be a first color, the region to the right of projected resource indicator 1022 may be a second color, and the region between current resource indicator 1020 and projected resource indicator 1022 may be a third color.

In accordance with the FIG. 10 embodiment, request result field 1024 may display a message such as "sufficient resources available" to inform a system user that, since the total projected resource usage is less than 100%, instantiation of the requested isochronous task will therefore not jeopardize deterministic performance of isochronous tasks on device 112.

Figure 11:
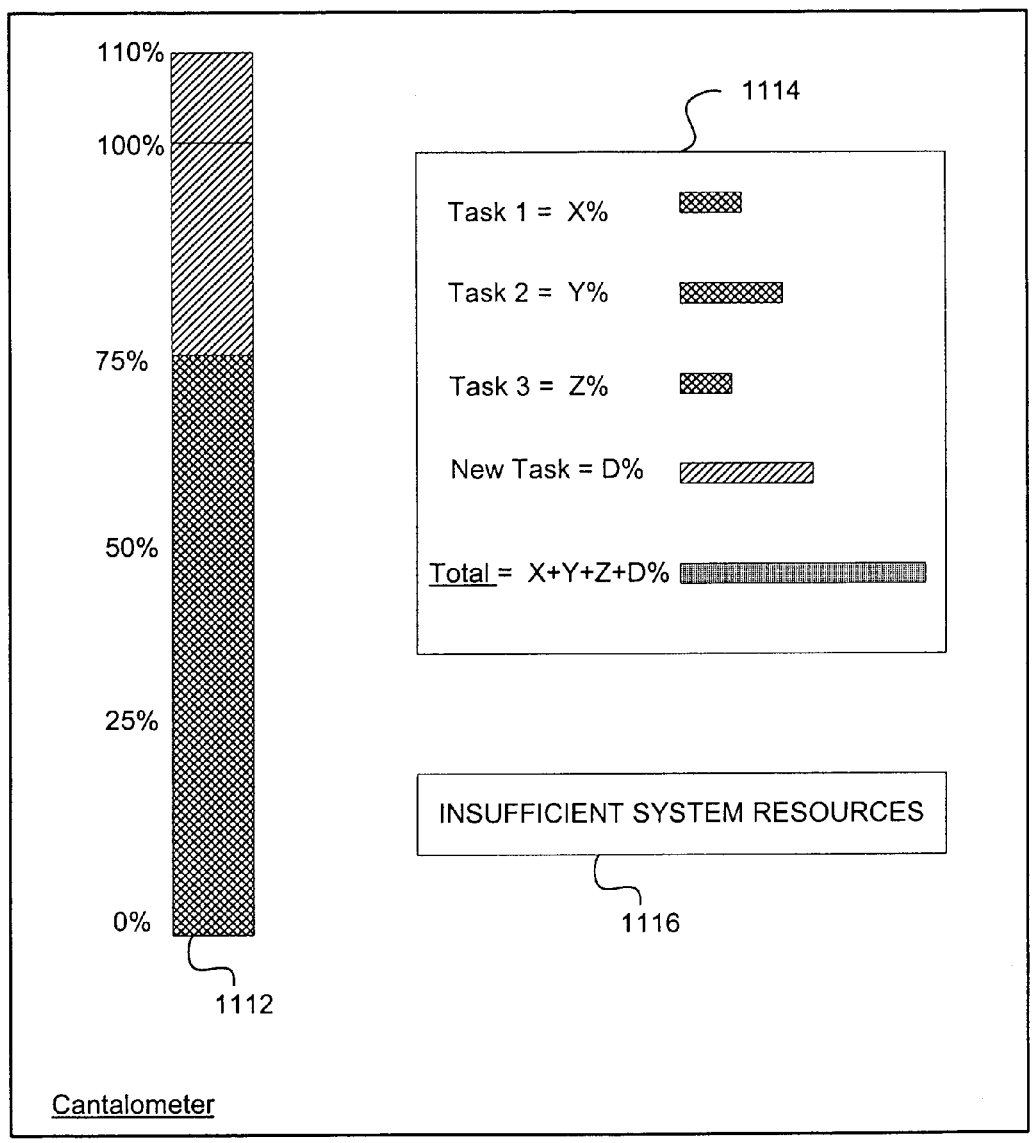
FIG. 11 is a diagram for another embodiment of a cantalometer in a request mode, in accordance with the present invention.

Referring now to FIG. 11, a diagram for another embodiment of a cantalometer 812(*c*) in a request mode is shown, in accordance with the present invention. In the FIG. 11 embodiment, cantalometer 812(*c*) preferably includes, but is not limited to, a resource scale 1112, a projected task summary display 1114, and a request result field 1116. In alternate embodiments of the present invention, cantalometer 812(*c*) may readily be implemented to include various other configurations, and may also include various items and components that are different from those discussed in conjunction with the FIG. 11 embodiment.

In the FIG. 11 embodiment, cantalometer 812(*c*) may be displayed as part of the user interface 214 for device 112 (FIG. 2) to facilitate interactive management of device resources by a system user. Cantalometer manager 322 preferably may obtain relevant information for display on cantalometer 812(*c*) from various sources such as cantaloupes 318 and cantaloupe manager 316.

In the FIG. 11 embodiment, cantalometer 812(*c*) may preferably be utilized during a request mode of device 112 to represent a projected total resource usage for device 112 for the condition that a user request for a new isochronous task was granted and the requested task was instantiated on device 112. In the FIG. 11 embodiment, resource scale 1112 preferably includes appropriate indicia to represent total device resource usage as a percentage of total available device resources on device 112. In the FIG. 11 embodiment, resource scale 1112 is shaded to display to a system user that approximately 75% of device resources are currently registered in cantaloupes 318 as being allocated for various isochronous processes or tasks.

In addition, in the FIG. 11 embodiment, resource scale 1112 is shaded to indicate to a system user that a particular newly-requested isochronous task that requires approximately 35% of total device resources would result in a total projected resource consumption of approximately 110%. In certain embodiments, resource scale 1112 may be divided into several regions of contrasting color, shading, or texture to more clearly demarcate the different sections. For example, the region to the below 75% may be a first color or texture, and the region above 75% may be a second color or texture.

In the FIG. 11 embodiment, projected task summary display 1114 preferably may include information regarding each of the individual isochronous tasks or processes that are currently active on device 112. For example, as shown in FIG. 11, each task listing in projected task summary display 1114 may include a task resource-usage percentage and a corresponding task resource-usage representation to indicate the percentage of total available device resources that a given task or process has been allocated.

In addition, projected task summary display 1114 preferably may include information regarding any new isochronous tasks or processes that have been requested for instantiation on device 112. For example, as shown in FIG. 11, a new task listing in projected task summary display 1114 may include a new task resource-usage percentage and a corresponding new task resource-usage representation to indicate the percentage of total available device resources that a given new task or process would consume. The projected task summary display 1114 may also include a projected total resource-usage percentage and a corresponding projected total resource-usage representation for the projected total percentage of available device resources that all current tasks and any new tasks would consume in the aggregate.

In accordance with the FIG. 11 embodiment, request result field 1116 may display a message such as "insufficient system resources" to inform a system user that, since the projected total resource usage is greater than 100%, instantiation of the requested isochronous task will therefore not be permitted because of the negative impact on deterministic performance of isochronous tasks on device 112.

Figure 12:
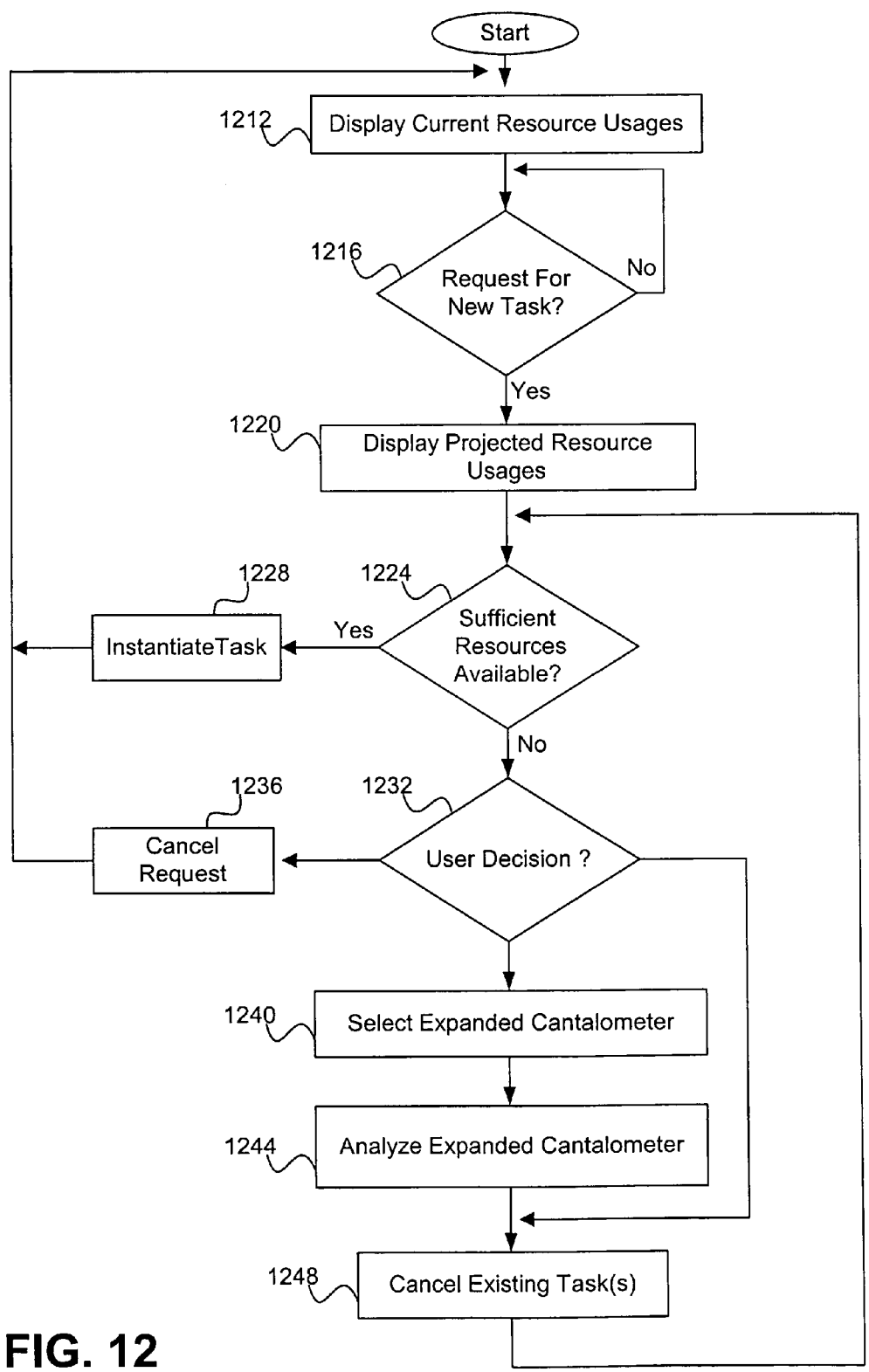
FIG. 12 is a flowchart of method steps for interactively managing device resources with a cantalometer, in accordance with one embodiment of the present invention.

Referring now to FIG. 12, a flowchart of method steps for interactively managing device resources with a cantalometer 812 is shown, in accordance with one embodiment of the present invention. In alternate embodiments, the FIG. 12 resource management procedure may readily be performed in various other manners and sequences, in accordance with the present invention.

Initially, in step 1212, cantalometer manager 322 preferably displays current resources usages for device 112 on cantalometer 812 in a normal operational mode. In step 1216, cantalometer manager 316 waits for a request for a new isochronous task or process from a system user or any other entity. In step 1220, if a request for a new isochronous task or process is generated, then cantalometer manager 322 preferably enters a request mode and displays projected resource usages on cantalometer 812.

In step 1224, cantaloupe manager 316 determines whether sufficient device resources are available to accommodate the newly-requested isochronous task or process. If sufficient device resources are available, then in step 1228, cantaloupe manager 316 grants the new request, and device 112 instantiates the new task or process. The FIG. 12 process then preferably returns to step 1212 to display current resource usages on cantalometer 812.

However, if sufficient device resources are not available in step 1224, then, in step 1232, a system user may preferably make a decision to perform an interactive action to manage resources on device 112. In step 1236, the system user may cancel the request for a new isochronous task, and the FIG. 12 process may then return to foregoing step 1212. Alternately, the system user may advance to step 1248 to select and cancel one or more existing tasks on device 112 to thereby increase unallocated resources on device 112.

In addition, in step 1240, the system user may select an expanded cantalometer 812(c) with various types of detailed and relevant information regarding resource allocation on device 112. Then, in step 1244, the system user may advantageously analyze the expanded cantalometer 812(c) to make interactive decisions regarding the management of device resources on device 112. Finally, in step 1248, based upon the analysis of foregoing step 1244, the system user may take an action such as selecting and canceling one or more existing tasks to thereby increase unallocated resources on device 112. The system user may thus sacrifice one or more existing tasks to thereby free device resources that are needed to instantiate the requested task. The FIG. 12 process may then return to step 1224 where cantaloupe manager 316 may determine whether sufficient device resources are now available for instantiating the requested isochronous process or task, in accordance with the present invention.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the embodiments described herein. Therefore, these and other variations upon the disclosed embodiments are intended to be covered by the present invention, which is limited only by the appended claims.

The invention claimed is:

1. A system for effectively managing resources in an electronic device, comprising:
   a resource characterization coupled to said electronic device, said resource characterization corresponding to a requested process;
   an interface manager configured to provide a user interface that includes resource information from said resource characterization, a system user viewing said user interface to interactively perform an analysis procedure of available system resources required to support said requested process, said user interface including projected resource usages for said requested process displayed in combination with allocated resources for existing processes, said interface manager displaying said projected resource usages for said requested process in combination with said allocated resources for said existing processes to thereby allow said system user to interactively manage said resources in said electronic device by alternately selecting a request cancellation, an existing task cancellation, and a resource analysis procedure that is performed by referencing an expanded user interface; and
   a processor device for controlling said interface manager.

2. A system for effectively managing resources in an electronic device, comprising:
   a resource characterization coupled to said electronic device, said resource characterization corresponding to a requested process;
   an interface manager configured to provide a user interface that includes resource information from said resource characterization, a system user viewing said user interface to interactively perform an analysis procedure of available system resources required to support said requested process, said user interface including projected resource usages for said requested process displayed in combination with allocated resources for existing processes, said interface manager displaying current existing resource usages in a normal operational mode on said user interface, said interface manager displaying said current existing resource usages and said projected resource usages on said user interface in a request mode, said projected resource usages including additional resources required for said requested process, said system user selecting an expanded user interface whenever said user interface indicates that sufficient additional resources are not available; and
   a processor device for controlling said interface manager.

3. The system of claim 2 wherein said expanded user interface comprises a task summary display that includes existing-task resource usage details and projected-task resource usage details.

4. The system of claim 2 wherein said expanded user interface comprises a task details display that includes individual resource details for one or more selected tasks.

5. The system of claim 2 wherein said system user performs a resource analysis procedure using said expanded user interface, and responsively cancels one or more existing tasks based on said resource analysis procedure.

* * * * *